United States Patent [19]

Kamai et al.

[11] 4,331,318

[45] May 25, 1982

[54] MAGNETIC TYPE FUEL INJECTION VALVE

[75] Inventors: Kenichiro Kamai, Toyoake; Norio Omori, Kariya; Shinichi Nishioka, Okazaki, all of Japan

[73] Assignee: Nippondenso Co., Ltd., Kariya, Japan

[21] Appl. No.: 156,464

[22] Filed: Jun. 4, 1980

[30] Foreign Application Priority Data

Jun. 5, 1979 [JP] Japan .................................. 54-70182

[51] Int. Cl.³ .............................................. F16K 31/06

[52] U.S. Cl. .................................... 251/139; 239/585; 251/141

[58] Field of Search ........................ 251/141, 129, 139; 239/585

[56] References Cited

U.S. PATENT DOCUMENTS 3,198,996 8/1965 Vollprecht ........................ 251/129 X 3,967,597 7/1976 Schlagmuller .................. 251/139 X

*Primary Examiner*—Arnold Rosenthal

*Attorney, Agent, or Firm*—Cushman, Darby & Cushman

[57] ABSTRACT

A magnetic type fuel injection valve comprises a stationary core magnetized upon energization of a magnetic coil, a movable core arranged in an axially opposed relation with the stationary core to be movable toward and away from the stationary core in response to the magnetization and demagnetization of the stationary core, and a needle valve connected to the movable core for controlling a fuel injection through a fuel injection port. The movable core is formed with a bottomed axial bore open to that end of the movable core which is remote from the stationary core. Into the bottomed axial bore is tightly fitted an end portion of the needle valve which is defined between one end face of the needle valve and a stepped portion thereof which is formed at a location spaced from the one end face and having a surface facing in an opposite direction from the one end face. A wall of the movable core which surrounds the surface of the stepped portion is calked onto the latter surface to securely connect the needle valve to the movable core.

2 Claims, 3 Drawing Figures

MAGNETIC TYPE FUEL INJECTION VALVE

BACKGROUND OF THE INVENTION

The present invention relates to a magnetic type fuel injection valve, particularly of the type suitable for use with an internal combustion engine, which is opened as an electromagnet is energized by electric current pulses controlled by electronic control means, to supply to a suction conduit of the engine a fuel pressurized to a predetermined pressure (in the range between 2 and 5 $kg/cm^2$).

Heretofore, there has been known a fuel injection valve of the type comprising a stationary core adapted to be magnetized upon energization of a magnetic coil, a movable core having one end opposed to one end of the iron core and being movable toward the one end of the iron core upon energization of the magnetic coil, a needle valve, and means for securely connecting the needle valve to the movable core to enable the former to move with the latter as a unit to thereby open and close a fuel injection port.

In the aforesaid type of fuel injection valve, it is known to use a construction wherein one end of the needle valve is threadedly connected to the movable core and the connected portion is secured in place by a bonding agent, to thereby prevent relative movement between the needle valve and the movable core. This construction has the disadvantage that the bonding agent may find its way into a needle valve guide and render the needle valve immovable.

West German Laid-Open Patent Specification (Offenlegungsschrift) No. 2,349,584 discloses a construction in which a needle valve formed at its end with irregularities is inserted into a hole formed in a movable core and then the movable core is compressed radially inwardly to deform the wall of the hole to conform in configuration with the irregularities in the end of the needle valve, thereby forcibly fitting and hence securing the irregular end of the needle valve to the wall of the hole in the movable core. This construction has the disadvantages that when the irregular end of the needle valve is forcedly fitted to the wall of the hole in the movable core, the movable core and the needle valve may not be coaxially arranged, and that repeated actuation of the needle valve may loosen the tight connection between the needle valve and the movable core.

SUMMARY OF THE INVENTION

The present invention obviates the aforesaid disadvantages of the prior art. Accordingly, an object of the invention is to provide a magnetic type fuel injection valve which provides good connection between the needle valve and the movable core with a simple construction.

According to the invention, there is provided a magnetic type fuel injection valve comprising a magnetic coil, a stationary core adapted to be magnetized upon energization of the magnetic coil, a movable core having one end opposed to one end of the stationary core and being movable toward one end of the stationary core upon magnetization of the stationary core, a needle valve, and means for securely connecting the needle valve to the movable core to enable the needle valve to move with the movable core to thereby open and close a fuel injection port, the connecting means including a bottomed axial bore formed in the movable core and open to the other end of the movable core remote from the iron core, and an end portion of the needle valve defined between one end face of the needle valve and a stepped portion formed on the needle valve, the stepped portion including a surface which faces substantially in an opposite direction from the one end face of the needle valve, the end portion of the needle valve being snugly or tightly fitted into the bottomed axial bore and securely fixed therein by a wall of the movable core which surrounds and is at least partially caulked onto the surface of the stepped portion.

DESCRIPTION OF THE PREFERRED EMBODIMENT

A preferred embodiment of the invention will now be described by referring to the accompanying drawings.

Figure 1:
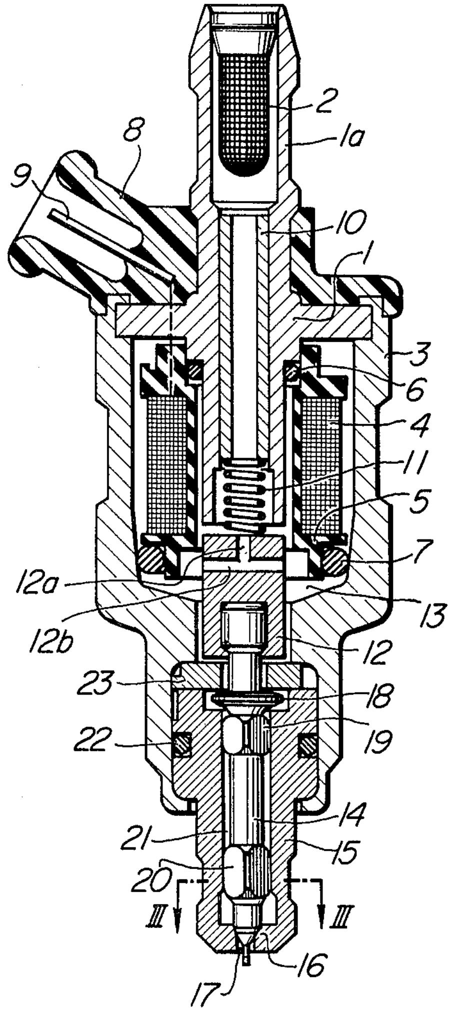
FIG. 1 is a vertical sectional view of the magnetic type fuel injection valve in accordance with an embodiment of the invention.

Referring to FIG. 1, a magnetic type fuel injection valve comprises a tubular stationary core 1 secured in a housing 3, and a movable core 12 opposed to the lower end of the stationary core 1. For example, the stationary core 1 may be composed of iron containing about 44% by weight of nickel. In an axial bore of the core 1 is fitted an adjusting pipe 10, and a spring 11 is mounted between the lower end of the adjusting pipe 10 and the upper end of the movable core 12 for normally urging the movable core 12 to move downwardly away from the stationary core 1. The biasing force of the spring 11 can be adjusted by inserting the adjusting pipe 10 into the axial bore of the stationary core 1 to a suitable axial position and fixing the same in that position. The stationary core 1 includes an upper end portion **1*a* which is in the form of a connector tube for connecting the fuel injection valve to a fuel supply line, not shown. A filter 2 is press-fitted in the connector tube 1*a*** for preventing foreign matter mixed in the fuel supplied thereinto from flowing to the engine.

A magnetic coil 4 is wound on a spool 5 which is fixed in place in an annular space between the stationary core 1 and the housing 3 and sealed by oil sealing O-rings 6 and 7. The magnetic coil 4 is connected to a terminal 9 which is secured in a connector 8 formed of synthetic resin unitarily with the housing 3, the terminal 9 being adapted to receive electric current pulses from electronic control means, not shown.

The bore of the adjusting pipe 10 fitted in the axial bore of the stationary core 1 serves as a fuel passage, and the O-rings 6 and 7 are effective to prevent inflow of the fuel into a space receiving the magnetic coil 4.

Figure 2:
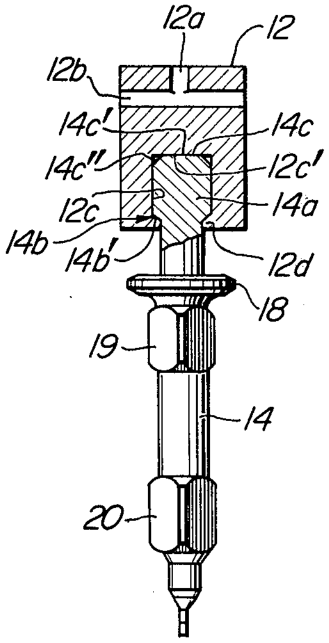
FIG. 2 is a view showing, on an enlarged scale, the connection for securing the needle valve to the movable core in the fuel injection valve shown in FIG. 1.

As shown in FIGS. 1 and 2, passageways **12*a* and 12*b* are formed in the upper portion of the movable core 12 for introducing the fuel to an outer space 13, and a bottomed, needle valve receiving bore or hole 12*c* is formed in the lower portion of the movable core 12 along the center axis thereof for receiving an upper end portion 14*a* of a needle valve 14. The needle valve 14 may be composed of stainless steel capable of effecting quenching. Formed in the outer circumferential surface of the lower part of the upper end portion 14*a* of the needle valve 14 is stepped portion 14*b*. The stepped portion 14*b* includes a surface 14*b*' oriented substantially in the same direction as a bottom surface 12*c*' of the bottomed, needle valve receiving hole 12*c*. A wall of the movable core 12 which surrounds the bottomed, needle valve receiving hole 12*c* is caulked at 12*d*, at the entire periphery or a part thereof, onto the surface 14*b*' of the stepped portion 14*b* of the needle valve 14. When the needle valve 14 is secured in this position, an end surface 14*c* of the needle valve 14 is in pressing engagement with the bottom surface 12*c*" of the hole 12 and the contact pressure between them is high. Thus the needle valve 14 moves unitarily with the movable core 12 in the axial direction in a nozzle body 15 as the movable core 12 moves, and the lower end of the needle valve 14 is brought into and out of engagement with a valve seat 16 formed in the nozzle body 15, to thereby close and open a fuel injection nozzle 17 at the lower end of the nozzle body 15. The surface 14*b*' of the stepped portion 14*b* is constituted from a tapered or inclined surface facing in an opposite direction from the end surface 14*c* of the needle valve 14. The end surface 14*c* of the needle valve 14 is of frusto-conical configuration and includes a flat central surface portion 14*c*' abutted on the bottom surface 12*c*" and a tapered edge surface portion 14*c*"**.

Figure 3:
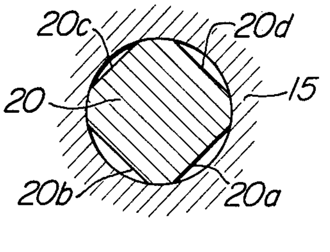
FIG. 3 is a sectional view taken along the line III-III in FIG. 1.

The needle valve 14 is formed at its upper portion with a flange 18 serving as a stopper, and with guide portions 19 and 20 which are disposed below the flange 18. A fuel passage 21 is formed between the guide portions 19 and 20. As shown in detail in FIG. 3, the guide portion 20 is chamfered at **20*a* to 20*d* to define fuel passages between the guide portion 20 and the nozzle body 15. The guide portion 19 is also similarly chamfered. In FIG. 1, 22 is an O-ring, and 23** a spacer.

The illustrated magnetic type fuel injection valve is constructed as described hereinabove. When the fuel injection valve is in the condition shown in FIG. 1, no electric current pulses are applied to the magnetic coil 4 from the terminal 9. When the valve is in this condition, the fuel under pressure flows from the connector tube **1*a* into the bore of the adjusting pipe 10, in turn passes around the spring 11, and in turn flows into the outer space 13 through the passages 12*a* and 12*b* in the movable core 12 and the gap between the movable core 12 and stationary core 1. The fuel flowing into the outer space 13 further flows through the guide portion 19, passage 21 and guide portion 20 to the valve seat 16 where the fuel stops flowing. Application of a current pulse to the magnetic coil 4 at this time magnetizes the stationary core 1, and the movable core 12 is attracted to the stationary core 1 against the biasing force of the spring 11. This moves the needle valve 14 upwardly in FIG. 1, and the lower end of the needle valve 14 is released from engagement with the valve seat 16, thereby permitting the fuel to be ejected in atomized particles through the fuel injection port 17. Upon completion of application of the current pulse, the stationary core 1 is demagnetized, and the movable core 12 is moved downwardly by the biasing force of the spring 11, so that the lower end of the needle valve 14 is brought into engagement with the valve seat 16, thereby completing the ejection of fuel through the port 17**.

From the foregoing description, it will be appreciated that the magnetic type fuel injection valve according to the invention effects fuel injections by moving the needle valve 14 axially together with the movable core 12 as a unit when current pulses are applied to the magnetic coil 4. According to the invention, the needle valve 14 is securedly connected to the movable core 12 by fitting the end portion **14*a* of the needle valve 14 into the bottomed, needle valve receiving hole 12*c* formed in the movable core 12 along the center axis thereof, and by caulking the wall of the movable core 12 surrounding the bottomed, needle valve receiving hole 12*c* against the surface 14*b*' of the stepped portion 14*b* formed in the needle valve 14. By this construction, arranging of the needle valve 14 and the movable core 12 coaxially with each other is facilitated and the disadvantage of the prior art using the bonding agent can be eliminated. Particularly, by virtue of the construction that the end surface 14*c* of the end portion 14*a* of the needle valve 14 is in pressing engagement with the bottom surface 12*c* of the bottomed, needle valve receiving hole 12*c*, and the wall 12*d* of the movable core 12 is caulked against the surface 14*b*' of the stepped portion 14*b* of the needle valve end portion 14*a*, movement of the movable core 12 and needle valve 14 relative to each other is effectively prevented, and no axial loosening of the connection between the movable core 12 and needle valve 14 occurs even after the needle valve 14 is repeatedly actuated. By forming a suitable number of notches in the surface 14*b*' of the stepped portion 14*b* of the needle valve 14, it will become possible to effectively prevent relative rotation between the movable core 12 and the needle valve 14 when the wall 12*d* of the movable core 12 is caulked onto the surface 14*b*' of the stepped portion 14*b*. Since the needle valve 14 is securedly connected to the movable core 12 by means of caulking, the need to cut a thread or form an annular groove on the end portion 14*a* of the needle valve 14** is eliminated. Thus, the number of process steps for fabrication and the production cost are reduced.

What is claimed is:

1. In a magnetic type fuel injection valve comprising a magnetic coil, a stationary core adapted to be magnetized upon energization of said magnetic coil, a movable core having one end opposed to one end of said stationary core and being movable toward said one end of said stationary core upon magnetization of said stationary core, a needle valve, and means for securely connecting said needle valve to said movable core to enable said needle valve to move with said movable core to thereby open and close a fuel injection port, the improvement wherein said connecting means comprises:

a bottomed axial bore formed in said movable core and open to the other end of said movable core remote from said stationary core so as to define a bottom surface therein;

an end portion of said needle valve defined between one end face of said needle valve and a stepped portion formed on said needle valve;

said one end face having a frusto-conical configuration and a flat central surface;

said stepped portion including a surface which faces substantially in an opposite direction from said one end face of said needle valve;

said end portion of said needle valve being tightly fitted into said bottomed axial bore so that said flat central surface abuts said bottom surface and securely fixed therein by a wall of said movable core which surrounds and is at least partially caulked onto said surface of said stepped portion.

2. A magnetic type fuel injection valve as set forth in claim 1, wherein said surface of said stepped portion is a tapered surface.

* * * * *